United States Patent [19]

Loose

[11] 4,396,167
[45] Aug. 2, 1983

[54] LOCK BAR AND BELT CLAMP RELEASE FOR SEAT BELT RETRACTOR

[75] Inventor: Richard D. Loose, Birmingham, Mich.

[73] Assignee: General Motors Corporation

[21] Appl. No.: 252,027

[22] Filed: Apr. 8, 1981

[51] Int. Cl.³ .................. A62B 35/02; B65H 75/48
[52] U.S. Cl. .................... 242/107.2; 242/107.4 A
[58] Field of Search .............. 242/107.2, 107.4 R, 242/107.4 E; 280/801–808; 297/474–480

[56] References Cited

U.S. PATENT DOCUMENTS

| | | | |
|---|---|---|---|
| 4,120,466 | 10/1978 | Adomeit | 242/107.2 |
| 4,273,301 | 6/1981 | Frankila | 242/107.2 |
| 4,277,037 | 7/1981 | Loose et al. | 242/107.4 A |
| 4,286,759 | 9/1981 | Usami et al. | 242/107.2 |

Primary Examiner—John M. Jillions
Attorney, Agent, or Firm—Charles E. Leahy

[57] ABSTRACT

A seat belt retractor includes a housing having laterally spaced first and second housing walls and a belt reel journaled for rotation by a reel shaft extending between the housing walls. A ratchet plate is attached to each end of the reel. A lock bar extends between the housing walls and has locking teeth adapted to selectively engage the ratchet plates to lock the reel against belt unwinding so that occupant movement away from the seat imposes an occupant restraint load on the belt which tends to spool down the belt on the reel. A belt clamping mechanism is mounted on the housing and is operable in response to the imposition of occupant restraint load on the belt subsequent to lockup of the belt reel to a clamp the belt against extending from the reel. A manually actuable release mechanism is operable by the occupant to forcibly disengage the lock bar from engagement with the ratchet plate and to simultaneously forcibly disengage the belt clamping mechanism from the belt to assure restoration of belt winding and unwinding.

2 Claims, 4 Drawing Figures

LOCK BAR AND BELT CLAMP RELEASE FOR SEAT BELT RETRACTOR

The invention relates to seat belt retractor and more particularly provides a manually actuable mechanism for forcibly disengaging a lock bar from engagement with the belt reel and disengaging a belt clamping mechanism to enable belt extension and retraction.

BACKGROUND OF THE INVENTION

Vehicle occupant restraint belt retractors have heretofore been provided with an inertia responsive pendulum or the like for pivoting a lock bar into engagement with a pair of toothed ratchet plates attached to the ends of a belt reel so that the length of a restraint belt extending from the reel is fixed to restrain an occupant upon a vehicle seat. The locking engagement between the lock bar and the ratchet plate teeth is effectively maintained for as long as an occupant restraining load is imposed on the belt even though the inertia stimulus is terminated.

It is known to use the aforedescribed seat belt retractor in a seat belt system of the type having one end of the belt connected to the vehicle door so that the belt will be automatically unwound to an unrestraining position when the door is opened and rewound to the restraining position when the door is closed. Copending patent application Ser. No. 116,836 filed Jan. 30, 1980 now U.S. Pat. No. 4,277,037 provides a manually actuated release lever which forcibly disengages the lock bar from engagement with the toothed ratchet plates to permit unwinding rotation of the belt on the reel so that the occupant can open the door and alight from the vehicle in those instances where the belt retractor is employed in a door mounted automatic belt system.

It is characteristic of the aforedescribed automatic belt system that many layers of belt are wound upon the retractor when the door is closed and the belt is in the restraining position. It has been observed that the imposition of an occupant restraint load upon the belt subsequent to locking of the reel by the inertia responsive pendulum causes the belt to tighten or spool down on the reel and thereby extend the effective length of the restraint belt. Accordingly, prior patents such as U.S. Pat. No. 4,120,466, issued Oct. 17, 1978 to Adomiet, disclose self-actuating belt clamping devices in which the belt is guided around a roller on the end of a lever so that imposition of an occupant restraint load on the belt pivots the lever to clamp the belt between a locking surface carried on the lever and a locking surface mounted on the fixed retractor housing.

The present invention provides a manually actuable mechanism for forcibly disengaging the belt clamping mechanism simultaneous with forceable disengagement of the lock bar from the belt reel so that the retractor is restored to the normal unlocked condition permitting belt winding and unwinding.

SUMMARY OF THE INVENTION

A seat belt retractor according to the invention includes a housing having laterally spaced first and second housing walls and a belt reel journaled for rotation by a reel shaft extending between the housing walls. A ratchet plate is attached to each end of the reel. A lock bar extends between the housing walls and has locking teeth adapted to selectively engage the ratchet plates to lock the reel against belt unwinding so that occupant movement away from the seat imposes an occupant restraint load on the belt which tends to spool down the belt on the reel. A belt clamping mechanism is mounted on the housing and is operable in response to the imposition of occupant restraint load on the belt subsequent to lockup of the belt reel to clamp the belt against extending from the reel. A manually actuable release mechanism is operable by the occupant to forcibly disengage the lock bar from engagement with the ratchet plate and to simultaneously forcibly disengage the belt clamping mechanism from the belt to assure restoration of belt winding and unwinding.

The object, feature and advantage of the invention resides in the provision of a manually operable release mechanism adapted to simultaneously forcibly disengage a lock bar from ratchet teeth of the belt reel and forcibly disengage a belt clamping mechanism to enable subsequent belt winding and unwinding.

BRIEF SUMMARY OF THE DRAWINGS

These and other objects, features and advantages of the invention will become apparent upon consideration of the specification and the appended drawings in which.

DESCRIPTION OF THE PREFERRED EMBODIMENT

Figure 1:
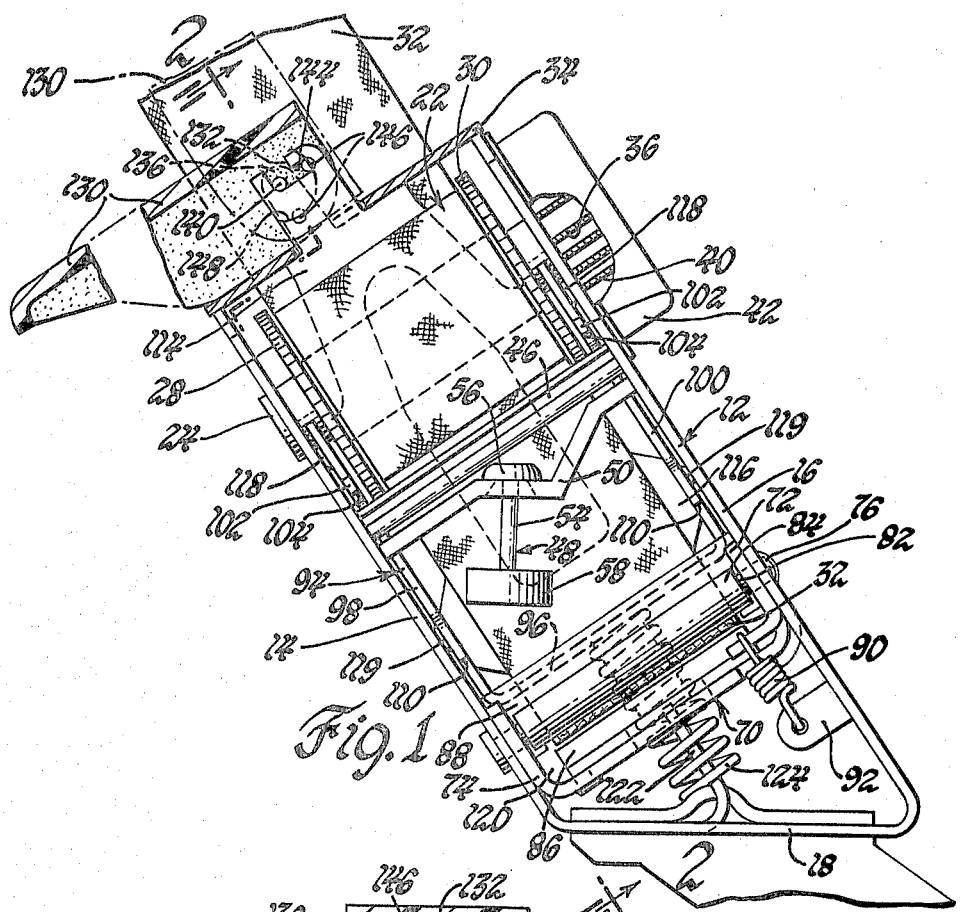
FIG. 1 is a side elevational view of a seat belt retractor embodying the invention.
Figure 2:
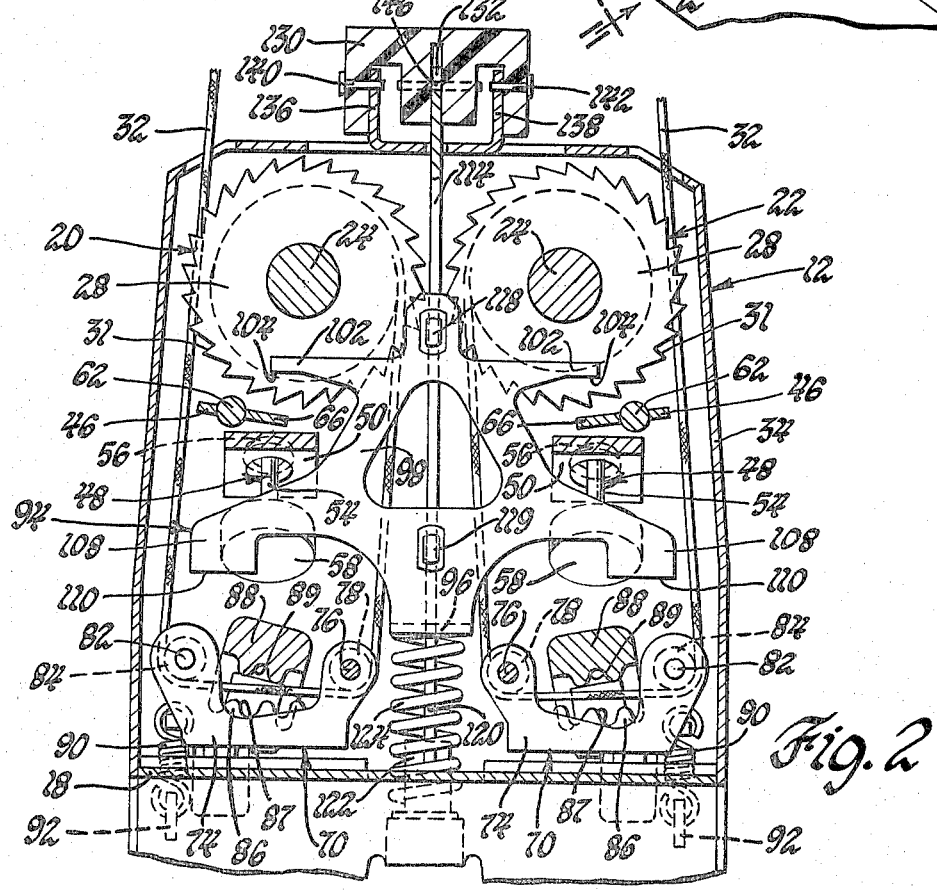
FIG. 2 is a sectional view taken in the direction of arrows 2—2 of FIG. 1 and showing the belt reels unlocked and the belt clamping mechanisms disengaged to permit free winding and unwinding of belt from the retractor.

Referring to FIGS. 1 and 2 of the drawings, there is shown a seat belt retractor having a pair of side-by-side mounted belt reels. The reels share a common housing which is suitably mounted on the vehicle body between the seating positions and respectively wind and unwind shoulder belts having their outboard ends mounted respectively on the driver and passenger door so that the belts are automatically moved between restraining and unrestraining positions by movement of the doors.

The retractor housing 12 includes a pair of spaced apart housing walls 14 and 16 which are joined by an integral base portion 18. Belt reels generally designated 20 and 22 are rotatably mounted between the housing walls 14 and 16 by reel shafts 24. Since the reels 20 and 22 and the reel locking and belt clamping mechanisms associated therewith are identical for both reels 20 and 22, like reference numerals are assigned to the identical components.

Reel 20 includes first and second ratchet plates 28 and 30 which are attached to the reel shaft 24 in closely spaced relation from the housing walls 14 and 16. The ratchet plates have circumferentially spaced teeth 31 facing in the belt unwinding direction. The restraint belt 32 is attached to the reel shaft 24 between the ratchet plates 28 and 30 and extends outwardly from the retractor through a housing cover 34 for positioning about the seated occupant.

The right hand end of the reel shaft 24 as viewed in FIG. 1 extends outwardly through the adjacent housing wall 16 and has a slot 36 which receives the inner end of a spiral spring 40. The outer end of the spiral spring 40, not shown, is suitably fixed to a spring cover 42 so that the reel 20 is normally biased in the belt winding direction to store the belt 32 on the reel and pull the belt taut against the seated occupant.

A locking mechanism for locking the reel 20 against belt unwinding rotation includes a lock bar 46 and a pendulum assembly 48 which is mounted by a pendulum support member 50. The pendulum assembly 48 has a stem 54 which extends through an aperture in the pendulum support member 50 and mushrooms outwardly to provide a control head 56. A weight 58 is staked to the lower end of the stem 54.

The lock bar 46 has pivot pins 62 which extend through apertures in housing walls 14 and 16 to mount the lock bar for pivotal movement. The lock bar 46 also has laterally spaced locking teeth 66 at each end thereof which are aligned with the ratchet teeth 31 of ratchet plates 28 and 30 for selective engagement therewith upon upward pivotal movement of the lock bar 46. The lock bar 46 normally rests upon the control head 56 of the pendulum assembly 48 to establish the lock bar locking teeth 66 in a normal spaced relation from the ratchet teeth 31 of ratchet plates 28 and 30.

A clamping mechanism is provided for clamping the belt 32 so that the occupant restraint load imposed on the belt does not spool down the many windings of belt on the reel and thereby result in an extension of the belt from the retractor which can result even though the reel 20 is locked against rotation by the lock bar 46. As best seen in FIGS. 1 and 2, the clamping mechanism includes a clamping lever 70 of stamped steel and having upturned legs 72 and 74 which are located closely adjacent the housing walls 14 and 16. A pivot shaft 76 extends through aligned apertures at one end of the legs 72 and 74 and the housing walls 14 and 16 to mount the clamping lever 70 for pivotal movement. The pivot shaft 76 also mounts a belt roller 78 around which the belt 32 passes. A second pivot shaft 82 extends between aligned apertures at the other end of the legs 72 and 74 and mounts a belt reaction roller 84 around which the belt 32 passes. A clamping member 86 is carried by the clamping lever 70 and has a convoluted clamping surface 87 adapted to mesh with a mating convoluted clamping surface 89 of a clamping member 88 fixedly mounted on the housing walls 12 and 14. A tension spring 90 acts between the clamping lever 70 and a tab 92 provided on the housing 12 to urge the clamping lever 70 to the normal position of FIG. 2 in which the clamping member 86 is spaced away from the clamping member 88 to permit free passage of the belt 32 around the rollers 78 and 80 during belt winding and unwinding.

Figure 3:
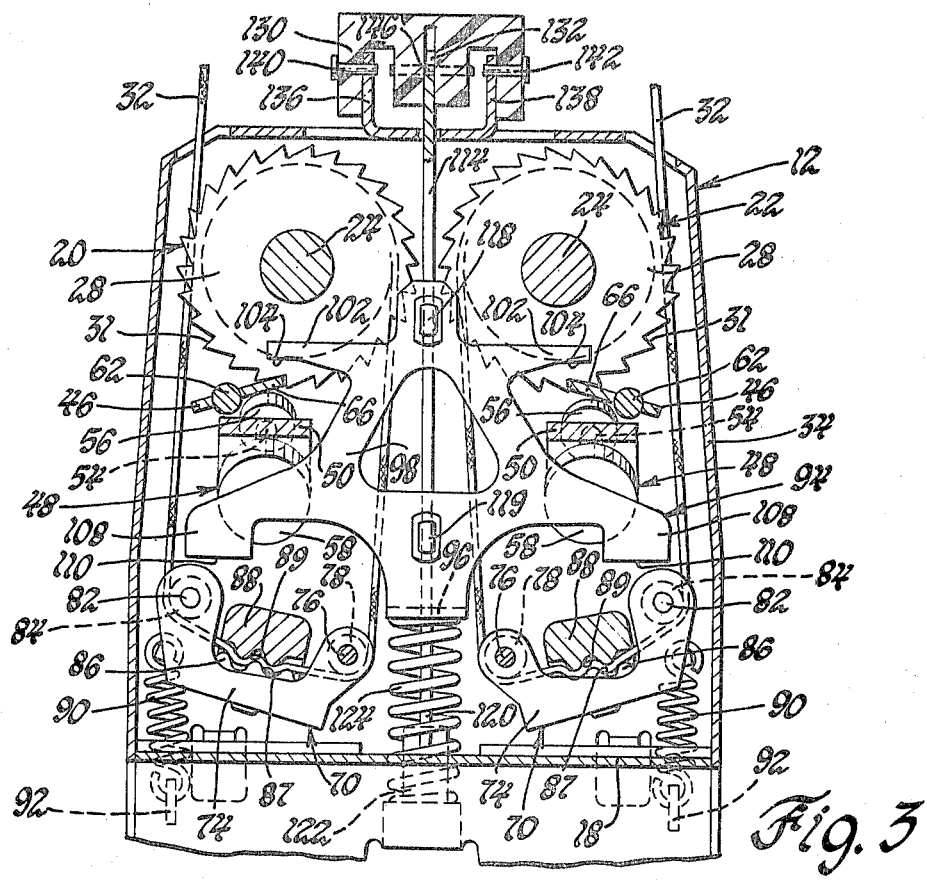
FIG. 3 is a view similar to FIG. 2 but showing the reels locked against rotation by pendulum actuated lock bars and the concomitant self-actuation of the belt clamping mechanisms to prevent spool down of belt from the reel.

Referring to FIG. 3, it is seen that a predetermined level of vehicle deceleration causes the pendulum assembly 48 to swing from the normal vertically depending position of FIGS. 1 and 2 to an inclined position causing the pendulum control head 56 to pivot and thereby raise the lock bar 46 upwardly to the position of FIG. 3 in which the lock bar locking teeth 66 engage the ratchet teeth 31 of both ratchet plates 28 and 30 and thereby block further unwinding rotation of the ratchet plates 28 and 30 and the belt reels 20 and 22.

The imposition of an occupant restraint load on the belt 32 during restraint of an occupant by the belt imposes a load on the clamping lever 70 via the roller 84 so that the spring 90 is overcome and the clamping member 86 is raised to clamp the belt between the clamping member 86 and the clamping member 88. The mating convolutions of the convoluted clamping surfaces 87 and 89 trap the belt 32 against extension from the retractor to thereby fix the length of the restraint belt 32.

Upon termination of the vehicle deceleration condition, the pendulum assembly 48 will return from the tilted position to the normal position of FIGS. 1 and 2. Assuming that there is no occupant restraining load remaining on the belt 32, the lock bar 46 will return from the engaged position of FIG. 2 to the normal disengaged position resting upon the pendulum control head 56 and the spring 90 will pivot the clamping lever downwardly to unclamp the belt. However, if the occupant's weight remains on the belt the belt load will hold the clamping lever in the raised position so that the belt remains clamped between the clamp members 86 and 88 and the locking interengagement between the lock bar 46 and the ratchet teeth 31 will retain the lock bar 46 in the ratchet wheel engaging position whether or not pendulum assembly 48 may have returned to the normal vertical position. Furthermore, the vehicle may come to rest at an unnatural attitude in which the force of gravity tilts the pendulum assembly 48 and thereby causes the lock bar 46 to be engaged or remain in engagement with the ratchet teeth 31 even though there may be no occupant restraining load acting on the belt 32.

A lock bar and clamp release mechanism is provided by which the lock bar 46 may be forcibly disengaged from engagement with the ratchet teeth 31 and the clamping lever 70 may be forcibly lowered to the FIG. 1 disengaged position. Referring to FIGS. 1 and 2, it is seen that a release member 94 is comprised of a sheet metal stamping and includes a base portion 96 which spans the distance between housing walls 14 and 16 and upturned walls 98 and 100 which are juxtaposed respectively with the housing walls 14 and 16.

As best seen in FIG. 2, the wall 98 includes abutment portions 102 which reach between the ratchet plates and the housing walls and have downwardly facing abutment faces 104 which overlie the lock bars 46 directly above the locking teeth 66 thereof. The release member wall 100 includes identical abutment portions 102 which extend into overlying relation with the other ends of the lock bars 46. The wall 98 also includes abutment portions 108 which are juxtaposed with the housing walls 14 and 16 and have downwardly facing abutment faces 110 which overlie the legs 74 of the clamping lever generally adjacent the belt rollers 84. The release member wall 100 includes identical abutment portions 108 which extend into overlying relation with the legs 72 of the clamping levers 70.

The lock bar release mechanism also includes a plunger 114 comprised of a sheet metal stamping which is situated in the space between the reels 20 and 22. The plunger 114 includes a central portion 116 which extends the full width between the release member walls 98 and 100 and has locking tabs 118 and 119 which extend laterally therefrom through mating apertures of the release member walls 98 and 100. The tabs 118 and 119 are swaged or otherwise enlarged to rigidly affix the release member walls 98 and 100 to the plunger 114. The lower end 120 of plunger 114 is bifurcated and mates with a similarly bifurcated housing tab 122 upstruck from the housing base portion 18 to restrain the plunger 114 for movement in only the vertical direction. A plunger spring 124 encircles the plunger lower end 120 and the housing tab 122 and acts upon the plunger to urge the plunger and release member 94 to the normal raised position of FIGS. 1 and 2 in which the abutment faces 104 are spaced above the lock bars 46 and the abutment faces 110 are spaced above the clamping levers 70.

Figure 4:
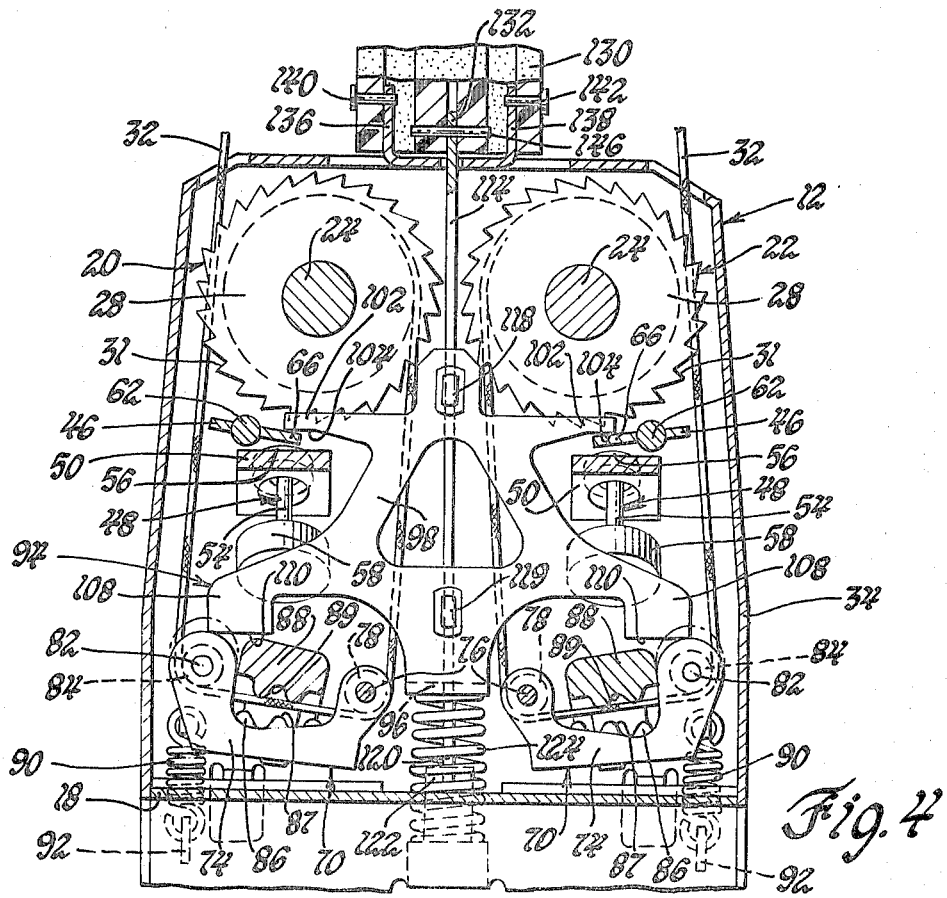
FIG. 4 is a view similar to FIG. 3 but showing actuation of a manually operable release mechanism to simultaneously forcibly disengage the lock bar from the reel and the belt clamping mechanisms so that belt winding and unwinding from the reel is restored.

A handle, generally indicated at 130, is connected to the plunger upper end 132 to permit selective operation of the plunger 114 and release member 94 to a depressed condition shown in FIG. 4. The housing cover 34 which surrounds the retractor housing 12 has a pair of hinge tabs 136 and 138 which are upstruck from the top wall of housing cover 34. The handle 130, preferably of injected mold plastic, is connected to the hinge tabs 136 and 138 by hinge pins 140 and 142. The plunger upper end 132 has a slot 144 which receives a pin 146 fixedly mounted within the handle 130. The handle 130 has a normal lowered position shown in FIG. 1 in which the plunger 114 and release member 94 are established in the normal position of FIGS. 1 and 2.

When an occupant wishes to forcibly disengage a lock bar 46 from engagement with the reels 20 and 22 and to disengage the clamping lever 70, the handle 130 is manually pivoted from the solid-line indicated lowered position of FIG. 1 to the phantom-line indicated raised position. Pivotal movement of the handle causes the pin 146 to move in an arcuate path designated 148 and in so doing to traverse the slot 144 and effect downward movement of the plunger 114. As best seen in FIG. 4, downward movement of the plunger 114 moves the release member 94 downwardly and in so doing causes the downwardly facing abutment faces 104 to simultaneously engage the lock bars 46 associated with both reels 20 and 22 and the abutment faces 110 to engage the legs 72 and 74 of the clamping lever 70.

A subsequent lowering of the handle 130 raises the plunger 114 and the release member 94 to the normal position of FIGS. 1 and 2 in which the reel locking mechanism and the belt clamping mechanism are returned for normal operation of the retractor.

Thus, it is seen that the invention provides a release mechanism for simultaneously forcibly disengaging the lock bar from a reel and disengaging a clamping mechanism from the belt to restore the retractor to the normal belt winding and unwinding condition of operation.

While the invention has been disclosed primarily in terms of the specific embodiment shown in the drawings, it is not intended to be limited thereto, but rather only to the extent set forth in the appended claims. For example, the clamping mechanism disclosed herein for forced disengagement by the manually actuable mechanism is not limited to the particular belt clamping arrangement shown in the drawings. The lock bar and belt clamp release mechanism of this invention may be advantageously employed to release other belt clamping mechanisms such as the belt roll-up retractor disclosed in U.S. patent application Ser. No. 152,353 by Kondziola, now U.S. Pat. No. 4,300,731.

The embodiments of the invention in which an exclusive property or privilege is claimed are defined as follows:

1. A seat belt retractor for winding an occupant restraint belt comprising:
  an immovable housing having laterally spaced first and second walls;
  a belt reel journaled for rotation on the immovable housing walls;
  a ratchet plate attached to each end of the reel generally adjacent the immovable housing walls;
  a lock bar extending generally between the housing walls and journaled for rotation relative thereto, said lock bar having locking teeth adapted for selective engagement with the ratchet plates upon rotation of the lock bar toward the ratchet plates of the reel so that occupant movement away from the seat imposes an occupant restraint load on the belt which tends to spool down the belt on the reel;
  belt clamping means movably mounted on the housing having a normal position permitting free passage of the belt therethrough and being movable by the belt load in the direction toward the reel to clamp the belt against spooling down from the reel;
  a release member having laterally spaced walls and including first abutment portions interposed between the respective ratchet plates and adjacent immovable housing wall to overlie the locking teeth of the lock bar in spaced relation therefrom and second abutment portions adapted to overlie the belt clamping means in spaced relation therefrom;
  and
  manually actuable handle means adapted to forcibly move the release member so that the first abutment portions engage the locking teeth of the lock bar and the second abutment portions engage the belt clamping means to simultaneously move the latch bar and the belt clamping means in the direction away from the reel to disengage the lock bar from engagement with the ratchet plates and disengage the belt clamping means from clamping engagement of the belt to restore the retractor to the normal condition permitting winding and unwinding of the belt.

2. A seat belt retractor for winding an occupant restraint belt in a vehicle body comprising:
  a housing having laterally spaced first and second walls immovably fixed to the vehicle body;
  a belt reel journaled for rotation on the immovable housing walls;
  a ratchet plate attached to each end of the reel generally adjacent the immovable housing walls;
  a lock bar extending generally between the immovable housing walls and journaled for pivotal movement relative thereto, said lock bar having locking teeth adapted for selective engagement with the ratchet plates upon pivotal movement of the lock bar toward the ratchet plates of the reel so that imposition of occupant restraint load on the belt tends to spool down the belt on the reel;
  a belt clamping lever extending generally between the immovable housing walls and having a first end pivotally mounted on the first and second walls of the immovable housing and having a second end;
  a roller attached to the second end of the clamping lever and having the belt routed therearound so that imposition of occupant restraint load on the belt pivotally moves the clamping lever;
  a first clamping member mounted on the clamping lever and a second clamping member immovably mounted on the immovable housing and having the belt routed therebetween so that pivotal movement of the clamping lever by the belt load imposed thereon clamps the belt between the first and second clamping members;

a release member having laterally spaced walls and including first abutment portions interposed between the respective ratchet plates and adjacent housing wall to overlie the locking teeth at both ends of the lock bar in spaced relation therefrom and second abutment portions adapted to overlie the second end of the belt clamping lever in spaced relation therefrom; and manually actuable handle means operable by the occupant to forcibly move the release member so that the first abutment portions engage the locking teeth at both ends of the lock bar and the second abutment portions engage the second end of the belt clamping lever to move both the lock bar and the belt clamping lever in the direction away from the reel to disengage the lock bar from engagement with the ratchet plates and disengage the first clamping member from clamping engagement of the belt against the second clamping member to restore the retractor to the normal condition permitting winding and unwinding of the belt.

* * * * *